United States Patent [19]

Murrin

[11] Patent Number: 5,156,225
[45] Date of Patent: Oct. 20, 1992

[54] ELECTRIC BATTERY AS STRUCTURAL COMPONENT OF VEHICLE

[76] Inventor: Craig M. Murrin, 111 N. Clinton, Dallas, Tex. 75208

[21] Appl. No.: 559,604

[22] Filed: Jul. 30, 1990

[51] Int. Cl.5 .............................................. B60K 1/00
[52] U.S. Cl. .................................... 180/65.1; 180/60; 180/68.5; 429/206; 429/225
[58] Field of Search ............... 180/65.1, 65.5, 68.5, 180/60; 429/206, 225

[56] References Cited

U.S. PATENT DOCUMENTS

| | | | |
|---|---|---|---|
| 519,602 | 5/1894 | Elieson | 429/225 |
| 3,391,752 | 7/1968 | Albright | 180/65 |
| 3,477,538 | 11/1969 | Hall et al. | 180/65 |
| 3,493,068 | 2/1970 | Albright | 180/65 |
| 3,616,872 | 11/1971 | Taylor | 180/65 R |
| 3,821,998 | 7/1974 | Hollins | 180/68.5 |
| 3,902,916 | 9/1975 | Warszawski | 429/206 |
| 3,983,952 | 10/1976 | McKee | 180/65 R |
| 4,044,852 | 8/1977 | Lewis et al. | 180/68.5 |
| 4,058,182 | 11/1977 | Huber | 180/68.5 |
| 4,135,593 | 11/1979 | Fowkes | 180/65 R |
| 4,165,794 | 3/1979 | Warner et al. | 180/65 R |
| 4,174,014 | 11/1979 | Bjorksten | 180/68.5 |
| 4,216,839 | 8/1980 | Gould et al. | 180/65.1 |
| 4,248,323 | 2/1981 | Gaffney | 180/291 |
| 4,267,895 | 5/1981 | Eggert, Jr. | 180/54 A |
| 4,339,015 | 7/1982 | Fowkes et al. | 180/65 R |
| 4,342,533 | 8/1982 | Hane | 414/396 |
| 4,365,681 | 12/1982 | Singh | 180/68.5 |
| 5,015,545 | 5/1991 | Brooks | 180/68.5 |

FOREIGN PATENT DOCUMENTS

| | | | |
|---|---|---|---|
| 3134258 | 3/1983 | Fed. Rep. of Germany | 180/68.5 |
| 2249544 | 6/1975 | France | 180/68.5 |

Primary Examiner—Eric D. Culbreth
Attorney, Agent, or Firm—Richards, Medlock & Andrews

[57] ABSTRACT

An electrically-powered vehicle wherein such vehicle is powered by storage batteries or fuel cells in which the plates of the batteries or cells, the spacing material between plates and the cases act as primary load-bearing members of the vehicle.

1 Claim, 2 Drawing Sheets

ELECTRIC BATTERY AS STRUCTURAL COMPONENT OF VEHICLE

TECHNICAL FIELD OF THE INVENTION

The present invention relates to electrically powered vehicles.

BACKGROUND OF THE INVENTION

As of late, the interest in electrically powered vehicles has been considerable. As compared to the conventional internal combustion engine and fuel powered vehicles, electrical power assumes a cleaner and less noisy operational function. Yet, a major limitation on the range, acceleration and other performance exists for electrically powered vehicles in that the power to weight ratio is extremely low. The batteries add weight to the vehicle in two senses: primarily, their own weight, and secondarily, the additional weight of the structural components of the vehicle necessary to give the vehicle the additional load-carrying capacity to carry the batteries. To resolve this problem, batteries with lighter weight materials such as doped plastic or aluminum have been proposed. However, such batteries have a mitigating effect, at best. Yet another problem has been the difficulty and inconvenience of removing the batteries from the vehicle without disassembling the vehicle.

Thus, there has been a need for an electrically powered vehicle that will have a sufficient amount of power without increasing the weight of the vehicle. In other words, an electrically powered vehicle with a high power to weight ratio. Furthermore, a structural design whereby the removability of the batteries is facilitated has also been desired.

SUMMARY OF THE INVENTION

Because of the low power to weight ratio of electrically powered vehicles and the inconvenience of charging electrically powered vehicles, it is the object of this invention to increase such ratio while maintaining an adequate structural support and to facilitate the removal of said batteries by instituting: (1) load-bearing characteristics to the plates; and (2) a convenient and practical procedure for the removability of the batteries. Concerning the load-bearing characteristics of the plates, the present invention incorporates not only load bearing vertical plates, but load bearing horizontal plates of the battery, as well, thus enabling the plate assembly to support the various loads encountered by the vehicle chassis, unassisted. Another variant of the present invention employs corrugations in either horizontal or vertical plates to provide the necessary stiffness. As a result, the weight of the outer case of the battery can be greatly reduced, lowering the vehicle weight and realizing the basic object of the invention.

Relevant to battery removal, in the present invention the batteries support the passenger compartment along its sides and are fixed to front and rear bulkheads by means of bolts running through the bulkheads, the battery case and into threaded members in brackets connecting plates of like charge. By doing this, not only is the ability of the plates to bear tension loads exploited, but more importantly, a practical means is provided for detaching the batteries from the vehicle fairly quickly using tools commonly found in service stations.

In summary, the present invention increases the power to weight ratio, enables the plate assembly to support the various loads encountered by the vehicle chassis, unassisted, and finally, facilitates the removal of the batteries.

DETAILED DESCRIPTION

Figure 1:
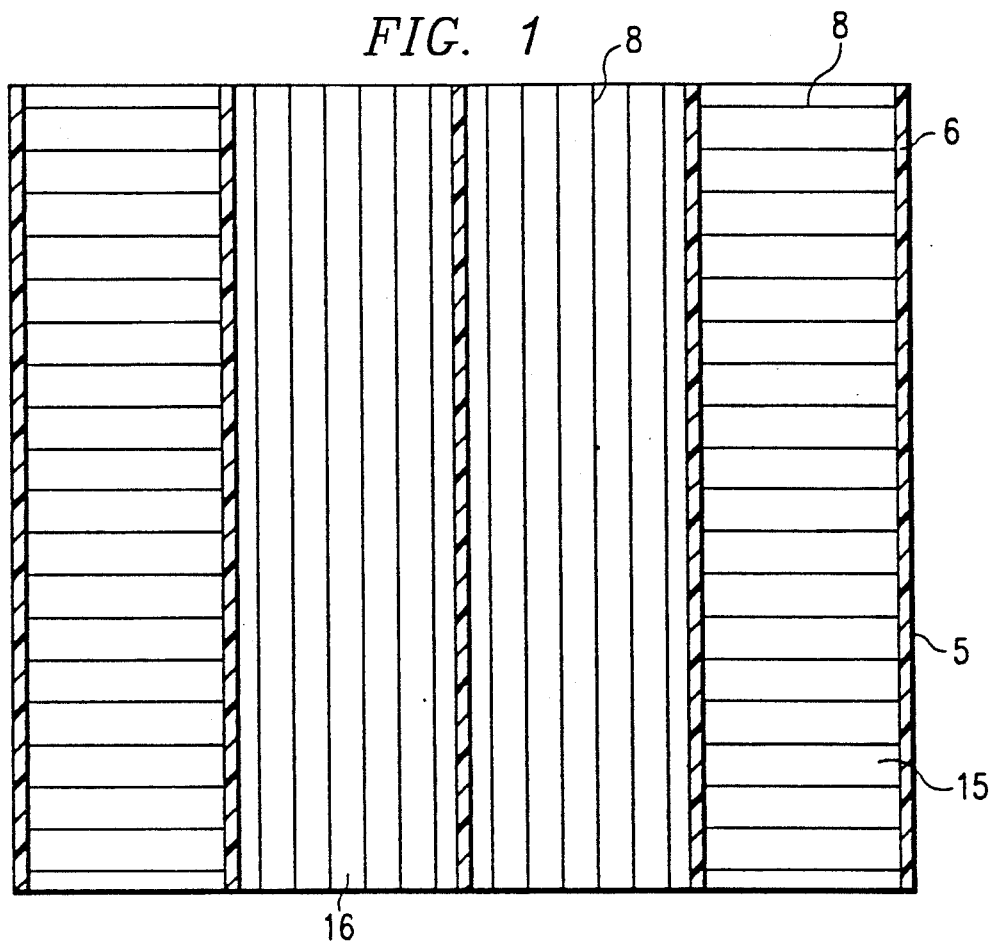
FIG. 1 is an end view of the battery (spacing material omitted) illustrating horizontal and vertical plates.
Figure 2:
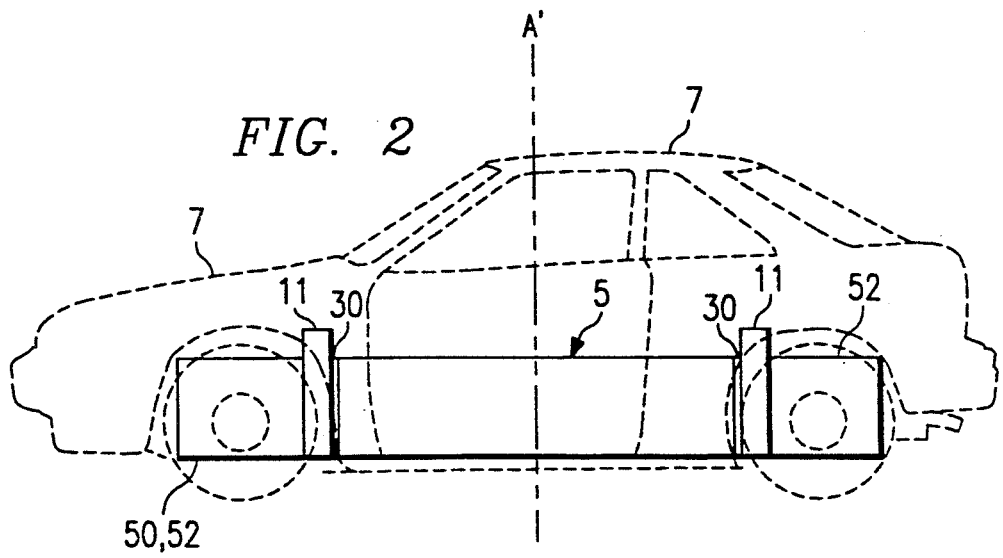
FIG. 2 is an illustration of two batteries joined to the bulkhead by bolts or other removable fasteners.

The present invention is comprised of a vehicle 7 which is powered by at least one battery 5, where said battery 5 also has load-bearing characteristics so as to form part of the frame or structure of the vehicle. The case of the battery or fuel cell 5 is comprised of one or more elongated polyhedral cells 6, that are joined together or molded as a single unit (FIG. 1). The major axes of the polyhedrons 6 are parallel to one another and such axes, and that of the entire battery 5, are parallel to the longitudinal axis of the vehicle 7.

The plates 8 of the battery 5 and the spacing material 9 (see FIG. 4) are narrow rectangles, whose length substantially corresponds to the length of the major axis of the polyhedral cell 6. The edges of the plates and spacers 9 contact the inside walls of the cell 5 along their entire length, so that loads on the cell walls are transferred to the plates 8 and spacers 9. The stack of layers of plates 8 and spacers 9 substantially fills the cell (the spacing material forming the top and bottom of the stack of plates) so that the loads resulting from the tendency of the plates 8 to buckle under load are transferred to the side walls of the cells. Plates 8 can be at any desired orientation, such as horizontal plates 15, vertical plates 16 or a combination of both as illustrated in FIG. 1. To the extent necessary to achieve the desired stiffness, the plates can be corrugated as plates 10 (FIG. 4) or otherwise bent along lines parallel to their major axis, and/or the stacks of plates 8 in adjacent cells 5 are arranged at an angle to one another so that the load transferred to the cell walls as described in the preceding sentence is further distributed to the plates 8 in the adjacent cells 5 whose minor or width axes are more or less parallel to the line of force of the transferred load (FIG. 1). To the extent the spacing material 9 between plates 8 lacks the compressive strength necessary to transfer loads to or from the plates 8, plugs or reinforcing material are arranged throughout the spacing material at intervals.

If a battery 5 is molded as a unit, provisions may be made for removable plugs at one end of each cell 5, so that the entire stack of plates 8 and spacers 9 may be removed for repair or replacement once the whole battery 5 has been removed from the vehicle 7 or is otherwise relieved of load.

Figure 3:
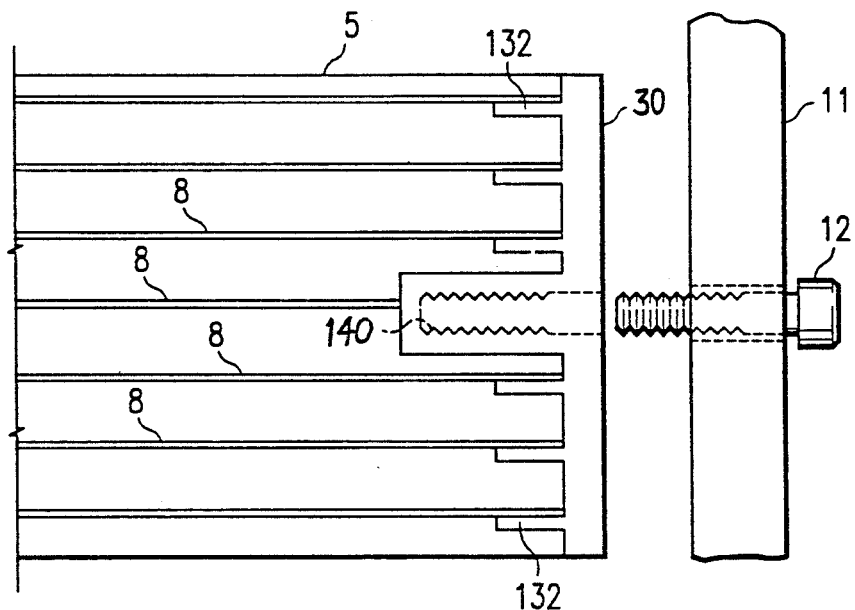
FIG. 3 is a side view of the battery cell secured to the bulkhead by at least one bolt.

In the case of automobiles and other four-wheeled vehicles, the preferred mode of employment involves the light, substantially non-load bearing vehicle body shell incorporating at either end a relatively strong heavy bulkhead 11. The motor 50 and/or transmission and suspension components 52 are attached to the bulkheads 11 or to a subframe attached to the bulkheads 11. The body design incorporates indentations in the outside surface of the lower portion of each of the two sides, shaped so that a battery fits against or partially within each of the indentations. The two batteries are joined to the bulkhead 11 by bolts 12 or other removable fasteners (FIG. 3). Thus, the loads on the vehicle are borne by the batteries 5, while allowing their easy removal. Battery 5 removal and replacement may be so greatly facilitated by this design as to enable vehicles incorporating it to be "refuelable" by replacing the batteries in the course of use instead of removing the whole vehicle from service for time-consuming recharging, thus extending the vehicle's useful range and flexibility. For example, a stop could be made on a long trip at a service station where a recharged battery is fit into the vehicle by the service attendant and the depleted battery is removed to be recharged by the service station for installation in the next customers vehicle. In the case of off-road or motorcycle-type vehicles which generally have fewer than four wheels, are generally cheaper, lighter and simpler, and have minimal body work, and where the useful range is not of large concern, the preferred mode may employ a single battery as the primary structural member running down the center of the vehicle, with suspension and motor attached directly to the battery at either end and with the operator straddling or otherwise sitting on top of the battery.

As stated above, the present invention incorporates a direct connection between the battery plates 8 and the structural bulkheads 11 of the vehicle 7. Such is accomplished via at least one bolt 12 per battery cell 5 passing through the bulkhead 11 into a bracket 13 incorporating a threaded socket 14 to threadedly receive bolt 12. The bracket is in turn riveted, glued, brazed, welded or otherwise attached to all the plates 8 of like polarity within the cell 5. Bracket 13 can also be removably attached to the remainder of the core of cell 5 to permit service of the plates 8 and other internal battery components.

With reference to FIG. 3, one design for connecting the battery plates 8 and structural bulkhead 11 is by using a bracket 30 cast or forged as a unit with a threaded socket 140 formed therein. The bracket 130 has a series of integral ridges 132 on its inner surface. A battery plate 8 can be lapped for attachment onto each of these ridges.

Figure 3A:
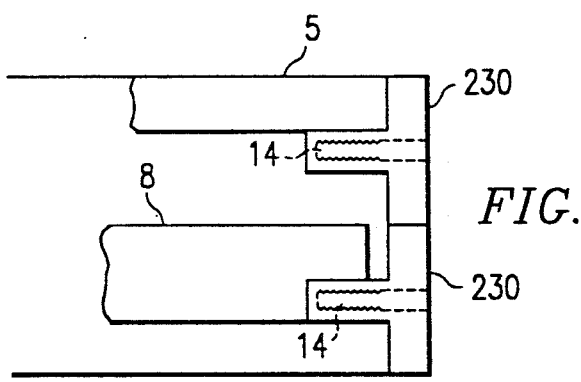
FIG. 3A is a side view of an alternative attachment of the battery cell to the bulkhead.

With reference to FIG. 3A, an alternative design is provided where plates 8 of opposite charge are used as structural members and two or more brackets 230 are used at the end of each cell. The ends of the plates can be notched where they mate with the brackets 230 to avoid contact with the adjacent oppositely charged plate. This configuration is illustrated in FIG. 3A.

The outer side of each of the brackets 30, and 230 is planar, except for the threaded holes 14 to receive bolts 12. The outer side lies flush with the ends of the battery case, allowing a seal to be formed around the threaded holes 14 to prevent electrolyte leakage, either by bonding the end cap of the battery case to the bracket 13 with adhesive or by means of a gasket if a removable cap is to be employed.

In this connection, there are at least three possible combinations of bolt 12 and bulkhead 11: (1) a metallic bolt such as steel in a non-conductive bulkhead, such as fiberglass or plastic; (2) a metallic bolt fitted to a metallic bulkhead through an insulating bushing made of Teflon or other material with like characteristics of wear-resistance (Teflon is used in suspension mounting bushings in racing vehicles) and electrical insulation (it is used as insulation in premium quality capacitors); and (3) a bolt made of an insulating material with high-tensile strength (e.g., Kevlar) and a metallic bulkhead. In variations (1) and (2), the mounting bolts also function as battery posts, being connected via jumpers on the side of the bulkhead opposite the battery.

Two of the novel elements of the invention, i.e., horizontal plates 15 or corrugated plates 10 and direct attachment of the plates to the bulkheads 11 of the vehicle 7, provide a sufficient structural basis so that the battery plates 8 may bear unassisted (a) the weight of the passengers and cargo ("static load"); (b) the twisting forces imposed on a chassis by bumps and cornering ("torsional load"); and (c) the "tension loads" imposed along the vehicle's length as a result of acceleration, braking and as a derivative of loads (a) and (b). Because of the structural support that the battery plates provide, the outer battery case 5 may be composed of a lightweight material such as the thermoset polymer resins (plastics) currently used in automobile batteries.

The static load can be visualized by imagining an ideal vehicle consisting of two axles connected by a simple chassis comprising a single thin metal plate shaped like a steel rule. If the plate 8 is laid flat on top of the axles and a modest load imposed, it will readily bend in the middle. If the plate 8 is placed on edge, (e.g., vertical battery plates 16) much heavier static loads can be borne, but as the load is increased, the vertical plates 16 will at some point begin to buckle or "bow" outward to the side. Chassis designers avoid this buckling by incorporating horizontal elements in their designs, e.g., the box section side rails in the traditional perimeter frame. The same horizontal elements prevent the twisting that vertical plates will display under the torsional loads created when the vehicle corners or goes over a bump.

Figure 4:
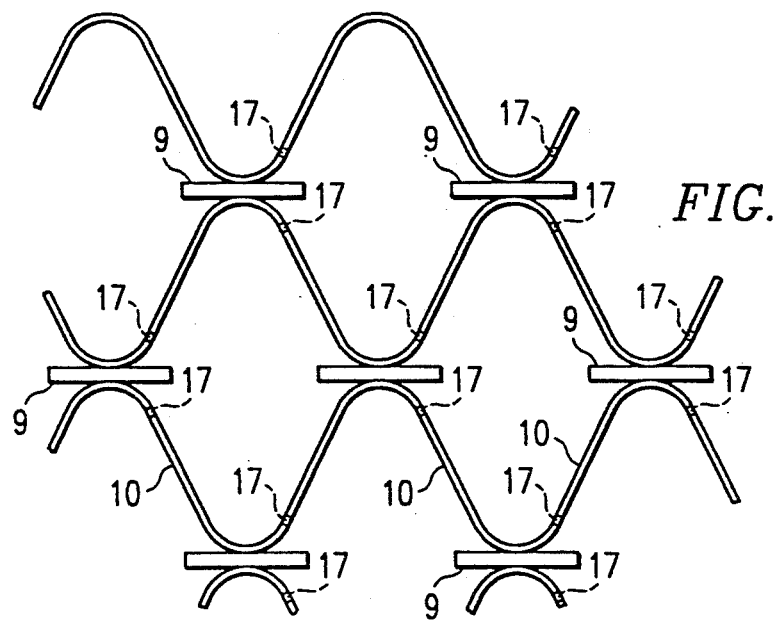
FIG. 4 is an end view illustration of horizontal corrugated electrodes.

In the first variant of this invention, stacks of horizontal plates 15 which contact the vertical plates 16 along their entire length (FIG. 1) perform this reinforcing function. The vertical plates 16 and horizontal plates 15 will most likely be separate cells, but since the load between them will be compressive such load can be borne and transferred by conventional plastic cell walls. In a variation, corrugated parallel plates 10 are used to give the necessary stiffness (FIG. 4). Such plates can be either horizontal plates 15, with the corrugations running longitudinally along the frame, or vertical plates 16, with the corrugations running vertically. The corrugated design may prove to be the most economical to manufacture, since it may permit the use of identical plates for all the cells of the battery.

A difficulty exists with horizontal plates 15 in that during the charging phase of batteries which use a liquid electrolyte gas is produced (hydrogen, in the case of the common lead acid type). Horizontal plates 15 tend to trap such gas within the battery, particularly as here where the plates are firmly in contact with the cell walls along their entire length for structural purposes. However, this difficulty can be surmounted by providing holes 17 at suitable intervals in the horizontal plates 15 and the spacing material 9 between them (FIG. 4). In a case of flat plates, it may be necessary to rest either the front or rear wheels of the vehicle on a small ramp while charging in order to provide enough of a slope for the bubbles of gas to pass along the underside of the plates to the holes at a desired rate. In the corrugated design (FIG. 4), this problem will be obviated to a large extent so long as the holes 17 are placed at intervals along the ridges of the corrugations; the bubbles will tend to travel up the slopes. Recently, the invention of a "solid state" battery has been announced. However, details of the design have not been available to the public. Such batteries apparently employ an electrolyte composed of a plastic doped with sulfate. Use of such batteries in connection with the present invention may altogether obviate the problem of gas build up noted above, and permit the design to be independent of such constraints.

In the present invention, battery 5 removal and thus increased range of said vehicle 7 is accomplished by the following procedure. The vehicle 7 would be lifted from the ground by a hydraulic lift seen in service stations and tire repair shops, placed so that the platform would contact the batteries along substantially their entire length, but would not contact the bulkheads at the two ends. Then, jack stands would be placed under jacking points located on the bulkheads, and the hydraulic lift would be lowered so that substantially all the vehicle's weight would be borne by the jack stands. Then, the wheels would be removed using air wrenches commonly found at such establishments, to afford access to the bolts mounting the batteries to the bulkheads. The same air wrench would be used to remove the bolts from the batteries. With the load being borne by the jack stands, the batteries should easily slip from between the bulkheads once they are unbolted. (Indeed, to the extent the body of the vehicle is a light, non-load-bearing affair, it will tend to sag in the middle spreading the bulkheads apart slightly. The doors would be opened before lifting to facilitate this and avoid window cracking or jamming.) Then, the hydraulic lift would be slowly lowered, depositing the batteries on wheeled dollies. Recharged batteries would be installed by reversing the sequence.

It is possible to envision this operation being carried out in substantially less than one hour by an operator having access to the tools mentioned above and some experience, though by no means any highly specialized training.

While I have illustrated the preferred embodiment of my invention, it must be put forth that the present invention is susceptible to other modifications and adaptations within the scope of the claims below. Therefore, it is not my intention to be limited to the details described herein.

I hereby claim:

1. A battery powered vehicle comprising:
   a frame structure having at least one bulkhead, and at least a battery, said battery secured by at least one removable fastener to said bulkhead;
   a bracket having a threaded socket sealed therein, said bracket connected to electrodes in the battery, whereby said bolt passes through said bulkhead into the threaded socket sealed into said bracket.

* * * * *